Patented June 5, 1945

2,377,585

UNITED STATES PATENT OFFICE 2,377,585

PRODUCTION OF CONDENSATION PRODUCTS OF ACETYLENE

Hanns Peter Staudinger, Ewell, and Karl Heinrich Walter Tuerck, Banstead, England, assignors to The Distillers Company Limited, Edinburgh, Scotland, a British company No Drawing. Application January 26, 1942, Serial No. 428,274. In Great Britain November 27, 1941

6 Claims. (Cl. 260—482)

This invention is for improvements in or relating to the production of condensation products of acetylene.

According to the present invention a process for the production of condensation products of acetylene, comprises condensing acetylene with a compound of the general formula: R—NH—X wherein R is an alkyl, aryl, acyl, aracyl or ester radicle, and X is a chlorine, bromine, iodine, nitrile, nitro, sulphonic or nitro-aryl radicle.

It will be appreciated that "nitro-aryl group" refers to a group in which the nitro-group is situated in any position in the aromatic nucleus in relation to the point of attachment of that nucleus to the nitrogen atom in the general formula.

In our co-pending application 428,273, filed Jan. 26, 1942, we have claimed broadly the condensation of acetylene with acidic organic nitrogen-containing compounds having a nitrogen-containing group of an acidic character, such that the aqueous solutions give a pH value of less than 7; we make no claim herein to the broad group of acidic organic nitrogen-containing compounds but only to the compounds of the general formula as set forth above. As examples of the compounds falling within the present invention may be mentioned: N-chlor-acylamides, N-cyan-acylamides, N-nitro-acylamides, N-chlor-urethanes, N-cyan-urethanes, N-nitro-urethanes, N-acyl-sulphonamides, N-alkyl- or N-aryl-nitramines and N-(nitroaryl)amines. The condensation is carried out in the liquid phase, preferably in the presence of catalysts.

Mercuric salts have been found to be suitable as catalysts, but other catalysts, for example, cadmium compounds, zinc compounds or heteropoly acids may also be used. The catalysts are preferably prepared by precipitation in situ; for example, by adding sulphuric acid to a reaction mixture in which a mercuric salt is dissolved or suspended.

The reaction may be carried out in the presence or absence of solvents. Suitable solvents include inert oxygen-containing substances, such as ketones, ethylidene diacetate or the liquid reaction products obtained during the reaction which remain as the residue after the lower boiling unsaturated reaction products have been removed by distillation.

In most cases the reaction proceeds satisfactorily at normal pressure, but if desired increased pressure may be employed. The temperature at which the reaction is carried out varies according to the nature of the reagent employed and its concentration.

When conducted in the liquid phase the reaction usually starts at room temperature and it is generally advisable to cool the reaction mixture so as to prevent the temperature rising to a point at which undesirable secondary reactions or decomposition take place; we prefer not to allow the temperature to rise above 100° C.

The following is an example illustrating the process of the invention with reference to the reaction between acetylene and a urethane derivative:

Into 62 g. monochlorurethane, to which 3 g. mercuric acetate and afterwards 2 g. sulphuric acid have been added, acetylene is introduced at room temperature. Vigorous absorption starts immediately and the temperature is maintained at 15° C. by cooling. After 2 hours 12 g. acetylene is absorbed. The reaction product is distilled in vacuo. A fraction boiling at 55° C./15 mm. consisting of the unsaturated addition product N-vinyl chlorurethane is obtained as well as a fraction boiling higher than monochlorurethane. The reaction product can be polymerised to a glass-clear substance.

The N-vinyl compounds formed in accordance with the present invention can be polymerised by the usual methods, e. g. by the action of heat, actinic light and/or catalysts such as peroxides. They are so readily polymerisable that we prefer to carry out the condensation and/or the subsequent distillation in the presence of diluents and/or antipolymerising agents, such as copper or phenols. Instead of the reaction products being distilled, the unchanged starting material can be extracted from the reaction product with aqueous alkalis so that the reaction product is not, or is at least only for a short time, subjected to high temperatures.

What we claim is:

1. N-vinylchlorurethane.

2. A process for the production of N-vinyl N-halogen-urethanes which comprises condensing acetylene in the liquid phase and at a temperature not exceeding 100° C. with a N-halogen urethane.

3. A process for the production of N-vinyl N-halogen-urethanes which comprises condensing acetylene in the liquid phase and at a temperature not exceeding 100° C. with a N-halogen urethane in the presence of an inorganic mercuric salt as catalyst.

4. A process for the production of N-vinyl N-halogen-urethanes which comprises condensing acetylene in the liquid phase and at a temperature not exceeding 100° C. with a N-halogen urethane in the presence of mercuric sulphate as catalyst.

5. A process for the production of N-vinyl N-halogen-urethanes which comprises condensing acetylene in the liquid phase and at a temperature not exceeding 100° C. with a N-halogen urethane in the presence of mercuric sulphate generated in situ by the action of sulphuric acid upon a mercuric compound as catalyst.

6. A process for the production of N-vinyl N-halogen-urethanes which comprises condensing acetylene in the liquid phase and at a temperature not exceeding 15° C. with a N-halogen urethane.

HANNS PETER STAUDINGER.
KARL HEINRICH WALTER TUERCK.